(12) United States Patent
Choi et al.

(10) Patent No.: US 8,958,443 B2
(45) Date of Patent: *Feb. 17, 2015

(54) METHOD AND DEVICE FOR ALLOCATING A BROADCAST CHANNEL IN A WIRELESS MOBILE COMMUNICATION SYSTEM

(71) Applicant: LG Electronics Inc., Seoul (KR)

(72) Inventors: Jin Soo Choi, Anyang-si (KR); Hee Jeong Cho, Anyang-si (KR); Doo Hyun Sung, Anyang-si (KR); Han Gyu Cho, Anyang-si (KR); Sung Ho Moon, Anyang-si (KR); Jin Sam Kwak, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/030,802

(22) Filed: Sep. 18, 2013

(65) Prior Publication Data

US 2014/0016605 A1    Jan. 16, 2014

Related U.S. Application Data

(63) Continuation of application No. 12/991,105, filed as application No. PCT/KR2009/003332 on Jun. 22, 2009, now Pat. No. 8,559,467.

(60) Provisional application No. 61/115,884, filed on Nov.

(Continued)

(51) Int. Cl.
*H04W 16/00* (2009.01)
*H04W 72/04* (2009.01)

(Continued)

(52) U.S. Cl.
CPC ............ *H04L 5/0044* (2013.01); *H04L 1/0079* (2013.01); *H04W 48/12* (2013.01); *H04W 72/0453* (2013.01)
USPC .......................................................... 370/522

(58) Field of Classification Search
CPC ......................... H04L 1/0079; H04W 72/0453
USPC ........................................................... 370/522
See application file for complete search history.

(56) References Cited

U.S. PATENT DOCUMENTS 8,204,021 B2   6/2012   Cho et al.
8,208,441 B2   6/2012   Cho et al.

(Continued)

FOREIGN PATENT DOCUMENTS

EP   1884061        11/2006
JP   11-113050 A    4/1999

(Continued)

OTHER PUBLICATIONS

K. J. Lim and C. S. Yoon, "Standardization Activity on IEEE 802.16m for IMT-Advanced systems," IEEE Electronics and Communication Trend Analysis, vol. 23, No. 2, Jun. 2008.
"The Draft IEEE 802.16m System Description Document", IEEE 802.16m-08/003r5, Oct. 3, 2008, pp. 71-74.

*Primary Examiner* — Melvin Marcelo
(74) *Attorney, Agent, or Firm* — McKenna Long & Aldridge LLP

(57) ABSTRACT

A method for receiving a superframe header at a mobile station in a wireless mobile communication system is disclosed. The method comprises receiving a sub-frame including the superframe header and a first data channel and decoding the received superframe header. Herein, the superframe header is located within a predetermined physical frequency band and the predetermined physical frequency band includes a synchronization channel.

10 Claims, 11 Drawing Sheets

Related U.S. Application Data 18, 2008, provisional application No. 61/117,577, filed on Nov. 25, 2008, provisional application No. 61/118,470, filed on Nov. 27, 2008, provisional application No. 61/118,662, filed on Dec. 1, 2008, provisional application No. 61/121,167, filed on Dec. 9, 2008, provisional application No. 61/138,525, filed on Dec. 18, 2008, provisional application No. 61/140,069, filed on Dec. 22, 2008, provisional application No. 61/142,369, filed on Jan. 4, 2009.

(51) Int. Cl.
    *H04L 5/00* (2006.01)
    *H04L 1/00* (2006.01)
    *H04W 48/12* (2009.01)

(56) References Cited

U.S. PATENT DOCUMENTS

| | | |
|---|---|---|
| 2006/0013168 A1 | 1/2006 | Agrawal et al. |
| 2008/0062944 A1 | 3/2008 | Smith |
| 2012/0026954 A1 | 2/2012 | Wang et al. |
| 2012/0093115 A1 | 4/2012 | Guan et al. |
| 2013/0023296 A1 | 1/2013 | Kim et al. |
| 2013/0128832 A1 | 5/2013 | Kang et al. |

FOREIGN PATENT DOCUMENTS

| | | |
|---|---|---|
| WO | 9512934 A1 | 5/1995 |
| WO | 2007052995 A1 | 5/2007 |
| WO | 2008038209 | 4/2008 |
| WO | 2008042514 A1 | 4/2008 |
| WO | 2008049327 | 5/2008 |

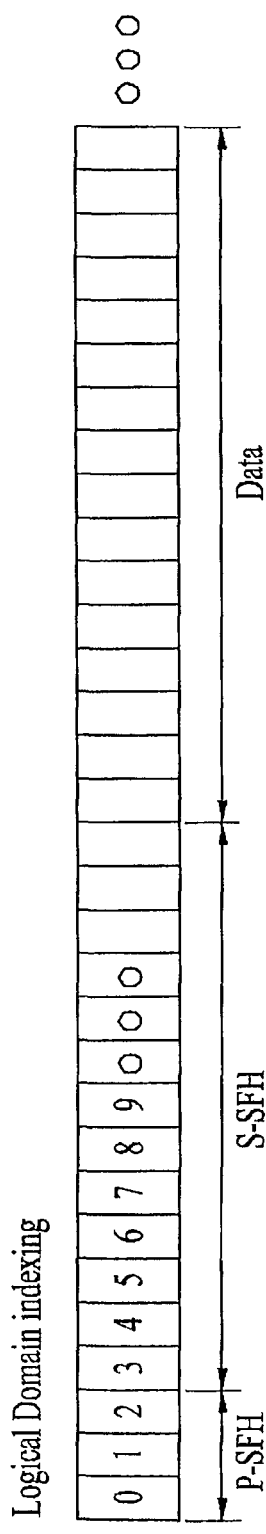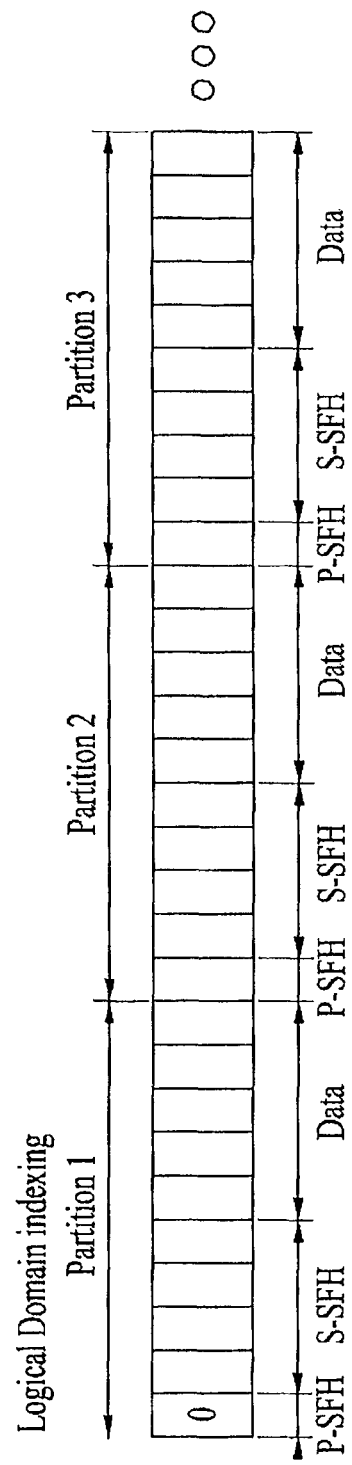

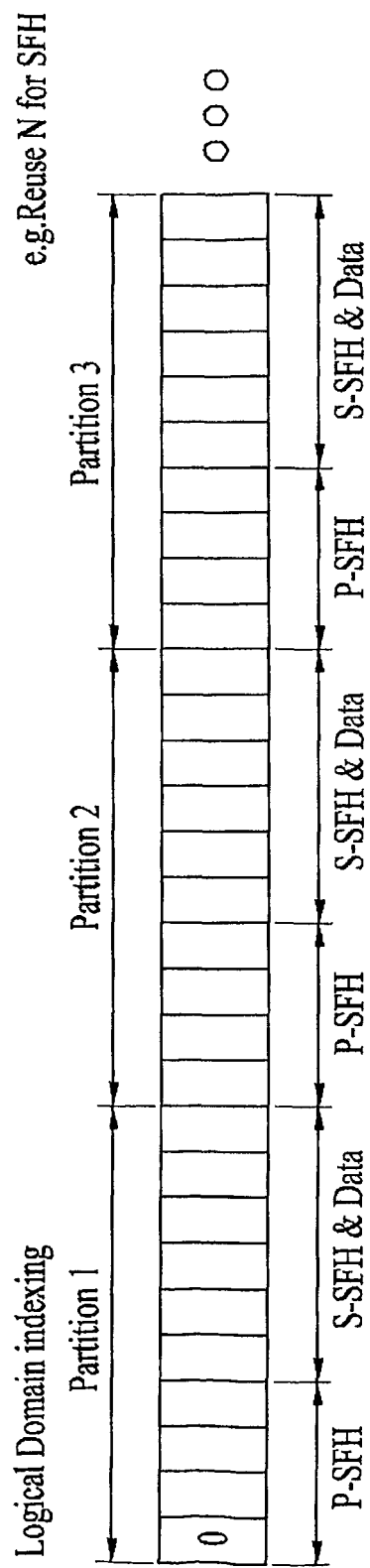

METHOD AND DEVICE FOR ALLOCATING A BROADCAST CHANNEL IN A WIRELESS MOBILE COMMUNICATION SYSTEM

This application is a continuation of, and claims the benefit of, U.S. application Ser. No. 12/991,105, filed Nov. 4, 2010, which is a 35 U.S.C. §371 National Stage Entry of International Application No. PCT/KR2009/003332, filed Jun. 22, 2009 and further claims the benefit of U.S. Provisional Application Nos. 61/115,884, filed Nov. 18, 2008, 61/117,577, filed Nov. 25, 2008, 61/118,470, filed Nov. 27, 2008, 61/118,662, filed Dec. 1, 2008, 61/121,167, filed Dec. 9, 2008, 61/138,525, filed Dec. 18, 2008, 61/140,069, filed Dec. 22, 2008, and 61/142,369, filed Jan. 4, 2009, all of which are incorporated by reference in their entirety herein.

TECHNICAL FIELD

This invention relates to a method for allocating and/or detecting a superframe header and a corresponding device in a wireless mobile communication system.

BACKGROUND ART

When a mobile station in a mobile communication system enters a communication network, the mobile station searches a base station in the network, and then attempts to get an initial network access. However, the base station does not recognize at the initial stage of the network access, and does not transmit a signal to the mobile station via a designated channel for the mobile station to inform network configuration information. Therefore, the base station should transmit the network configuration information through a superframe header (SFH), which can be also called as a broadcast channel (BCH) in this document. However, if the mobile station does not know the location and size of the SFH, the mobile station cannot decode the SFH and fails to get an access to the network. Therefore, it is necessary to pre-define the size and location of the SFH so that the mobile station can decode the SFH.

In a cellular orthogonal frequency division multiplex (OFDM) wireless packet communication system, uplink/downlink packet transmission for data and/of control information is made on a sub-frame basis and one sub-frame is defined by a certain time interval including a plurality of OFDM symbols.

A basic frequency time resource building block is called as 'resource unit (RU)' in IEEE 802.16 standards or as 'resource block (RB)' in 3GPP LTE ($3^{rd}$ Generation Partnership Project Long Term Evolution), both of which adopt an orthogonal frequency division multiple access (OFDMA) scheme. A RU comprised of a predetermined number of sub-carriers and OFDMA symbols.

The RUs in physical frequency domain is called as physical resource units (PRUs). The PRUs are mapped to so-called logical resource units (LRUs), which are in one-to-one mapping relationship for the sake of efficient resource management. A mapping relationship between the LRUs and the PRUs can be described on a sub-frame basis. Also, the mapping relationship between the LRUs and the PRUs can be described using a pre-defined mapping relationship between indexes of the LRUs and indexes of PRUs.

The LRUs are further classified into contiguous resource units (CRUs) and distributed resource units (DRUs). If a scheduled number of CRUs are allocated for a mobile station, the CRUs are mapped to a group of PRUs which are contiguous in physical frequency domain. On the other hand, if a scheduled number of DRUs are allocated for a mobile station, the DRUs are mapped to a plurality of PRUs which are spread over the physical frequency domain.

To spread the DRUs over the physical frequency domain, a predetermined permutation rule designed for obtaining frequency diversity gain can be used. Permutation may be considered to be a mapping process of a set of elements to other elements of the same set, i.e., exchanging (or "permuting") elements of a set. Alternatively, permutation can be regarded as an assignment operation, with the indexes of a set of the PRUs assigned to the indexes of a set of the DRUs. Or, the permutation can be regarded as an index reordering process for a set of elements with indexed.

The DRUs are generally used for the scheme called as frequency diversity scheduling (FDS) scheme and the CRUs are generally used for the scheme called as a frequency selective scheduling (FSS) scheme. The FDS scheme is a transmission scheme that obtains a reception performance gain through frequency diversity, and the FSS scheme is a transmission scheme that obtains a reception performance gain through frequency selective scheduling.

In the FDS scheme, a transmission stage transmits one data packet over sub-carriers widely distributed in a system frequency domain so that symbols in the data packet can experience various radio channel fading. Therefore, an improvement in reception performance is obtained by preventing the entire data packet from being subject to unfavorable fading. In contrast, in the FSS scheme, an improvement in reception performance is obtained by transmitting the data packet over one or more consecutive frequency areas in the system frequency domain which are in a favorable fading state.

In a cellular wireless packet communication system, a plurality of terminals is present in one cell. At this time, because the radio channel conditions of the respective terminals have different characteristics, it is necessary to perform data transmission of the FDS scheme with respect to a certain terminal and data transmission of the FSS scheme with respect to a different terminal even within one sub-frame. As a result, a detailed FDS transmission scheme and a detailed FSS transmission scheme must be designed such that the two schemes can be efficiently multiplexed within one sub-frame.

In the FSS scheme, a gain can be obtained by selectively using a band favorable to a mobile station (MS) among all available bands. In contrast, in the FDS scheme, an evaluation is not made as to whether a specific band is good or bad, and, as long as a frequency separation capable of adequately obtaining diversity is maintained, there is no need to select and transmit a specific frequency band. Accordingly, it is advantageous to an improvement in entire system performance to perform the frequency selective scheduling of the FSS scheme preferentially when scheduling.

In the FSS scheme, because data is transmitted using sub-carriers consecutively contiguous in the frequency domain, it is preferable that the data is transmitted using CRUs. On the other hand, because data is transmitted using sub-carriers spread the frequency domain, it is preferable that the data is transmitted using DRUs. Therefore, when a FDS transmission scheme and a FFS transmission scheme are multiplexed in a sub-frame, the CRUs and the DRUs are accordingly multiplexed in a frequency division multiplexing manner in the sub-frame.

A distributed resource allocation, such as the FDS transmission scheme, should be applied for a SFH to get a diversity gain the SFH. However, if a SFH is multiplexed with a data channel in a sub-frame in FDM manner and if the resource allocation for the SFH is needed to be pre-defined, it is difficult to apply the same distributed permutation rule as is applied to the data channel to the SFH. This is because the resource location of a SFH is required to be pre-defined. Therefore, to transmit a SFH, it is necessary to define a new resource allocation for a sub-frame including a SFH, which is different from the permutation rule of other sub-frames not including a SFH.

DISCLOSURE OF INVENTION

Technical Problem

The technical problem to be solved by the present invention concerns how to design a new resource allocation rule for a superframe header, which can be also called as a broadcast channel in this disclosure, in a wireless mobile communication system.

Technical Solution

To solve the technical problem, according to one aspect of the present invention, a method for receiving a superframe header at a mobile station in a wireless mobile communication system is provided. The method comprises receiving a sub-frame including the superframe header and a first data channel, and the superframe header is located within a pre-determined physical frequency band.

According to another aspect of the present invention, a method for receiving a superframe header at a mobile station in a wireless mobile communication system is provided. The method comprises receiving a sub-frame including the superframe header and a first data channel. The maximum granularity of a permutation for the superframe header is one resource unit, and a permutation rule applied for the superframe header is the same as a permutation rule applied for the first data channel.

According to still another aspect of the present invention, a receiver for receiving a superframe header in a wireless mobile communication system is provided. The receiver comprises a radio frequency unit for receiving a sub-frame including the superframe header and a first data channel, and a processor for decoding the superframe header and the first data channel, the processor being electrically connected to the radio frequency unit. Herein, the superframe header includes resource allocation information of the first data channel, and the processor is configured to decode information carried by the superframe header.

According to still another aspect of the present invention, a method for transmitting a superframe header at a base station to a mobile station in a wireless mobile communication system is provided. The method comprises transmitting a sub-frame including the superframe header. Herein, the superframe header is located within a predetermined physical frequency band, and a bandwidth of the predetermined physical frequency band is a same value as a minimum bandwidth supported by the mobile station.

According to still another aspect of the present invention, a method for transmitting a superframe header at a base station to a mobile station in a wireless mobile communication system. The method comprises transmitting a sub-frame including the superframe header and a first data channel. Herein, the maximum granularity of a permutation for the superframe header is one resource unit, and a permutation rule applied for the superframe header is the same as a permutation rule applied for the first data channel.

Advantageous Effects

According to the present invention, an efficient resource allocation rule for a superframe header in a wireless mobile communication system is provided.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 5 shows an exemplary logical domain indexing for P-SFH, S-SFH, and data, for a SFH in frequency reuse factor 1 region.

FIG. 6 shows an exemplary logical domain indexing for P-SFH, S-SFH, and data, for a SFH in frequency reuse factor N region (N>1).

FIG. 7 shows another exemplary logical domain indexing of P-SFH, S-SFH, and data, for a SFH in frequency reuse factor N region (N>1).

MODE FOR INVENTION

Figure 1:
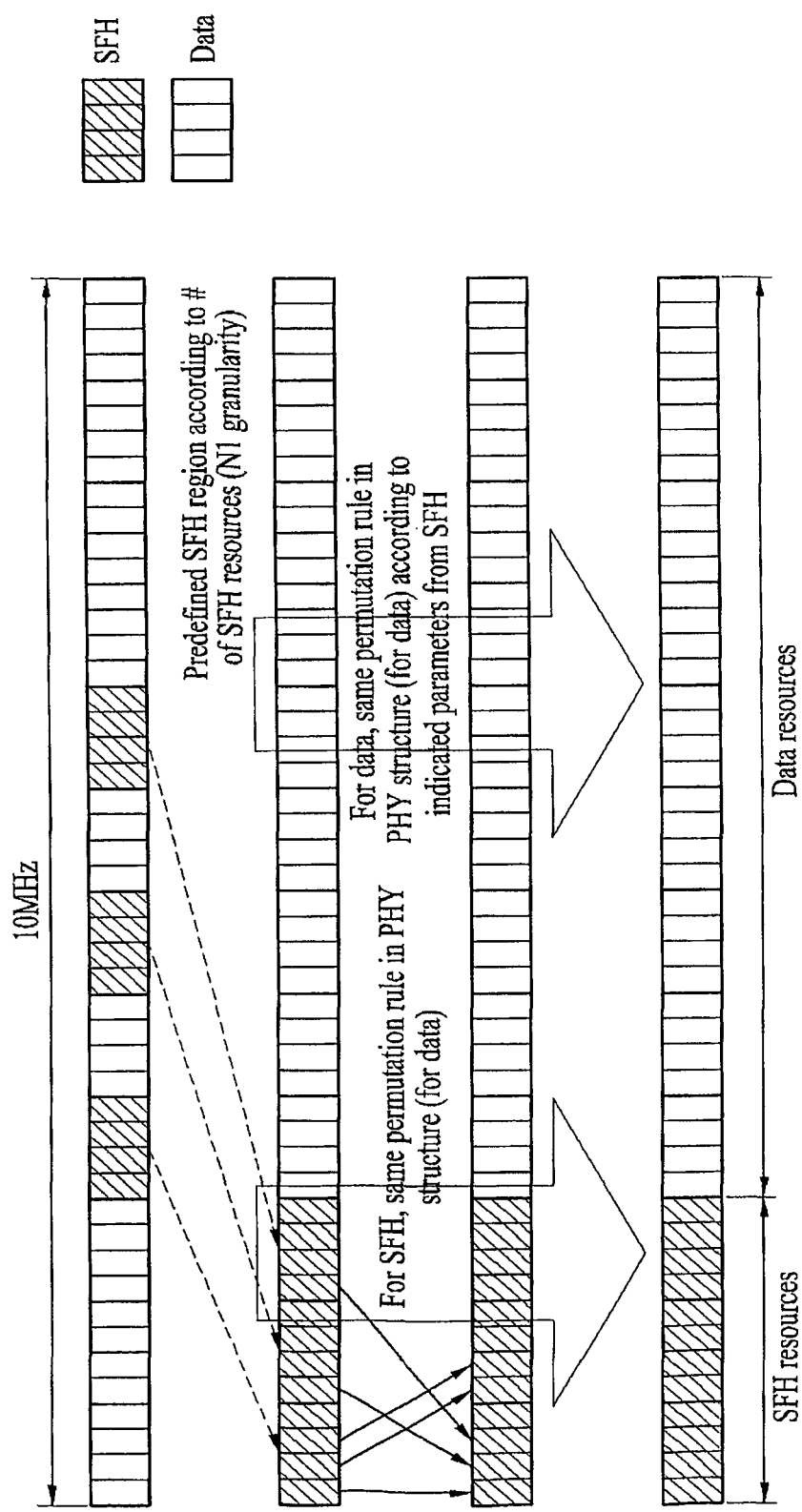
FIG. 1 shows an exemplary resource allocation rule for a SFH according to one embodiment of the present invention.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings.

This document incorporates by the latest version of reference the contents of IEEE 802.16m-07/002r7, "802.16m System Requirements Document (SRD)", IEEE 802.16m-08/003r9a, "The Draft IEEE 802.16m System Description Document", IEEE P802.16 Rev2/D7, "Draft IEEE Standard for Local and Metropolitan Area Networks: Air Interface for Broadband Wireless Access," October 2008, and IEEE 802.16m-08/0010r2, "IEEE 802.16m Amendment Working Document."

Hereinafter, the method and a device for the present invention will be explained.

A Superframe header (SFH) carries essential system parameters and system configuration information. The SFH is divided into two parts: Primary Superframe header (P-SFH) and Secondary Superframe header (S-SFH), which can be also called as Primary Broadcast Channel (PBCH) and Secondary Broadcast Channel (SBCH) in this document, respectively. The P-SFH and S-SFH are included in the SuperFrame Header (SFH) that is located in the first sub-frame within a superframe. The P-SFH and S-SFH can be multiplexed with a Synchronization Channel (SCH) in Time Division Multiplexing (TDM) manner. If a SFH occupies narrower bandwidth than the system bandwidth, the P-SFH and S-SFH in the SFH may be multiplexed with data within the same sub-frame in Frequency Division Multiplexing (FDM) manner. The P-SFH is multiplexed with the S-SFH within the first sub-frame of a superframe in FDM manner.

The P-SFH is transmitted with a periodicity of one superframe of a predetermined time duration, e.g., 20 ms or 40 ms. The P-SFH includes the essential parameters for mobile stations (MSs) to identify a base station (BS) and the control information of other system information, sub-S-SFHs and additional system information. A possible P-SFH message format is defined in Table 1.

TABLE 1

| Syntax | Size (bit) | Notes |
|---|---|---|
| P-SFH_message( ) { | | |
| BS ID | 48 | |
| Super frame number | 11 | |
| sub-S-SFH scheduling information | 6 | sub-S-SFH1~6 |
| Change count (common) | 8 | |
| Change toggle bitmap | 4 | sub-S-SFH1~4 |
| } | | |

The S-SFH may be scheduled within the sub-frame where the P-SFH is transmitted. The S-SFH is divided into a number of sub-S-SFHs, that is, sub-S-SFH1, sub-S-SFH2, sub-S-SFH3, sub-S-SFH4, sub-S-SFH5, and sub-S-SFH6, and each sub-S-SFH may be scheduled with a periodicity of multiple superframes, e.g. 20 ms, 40 ms and so on or be scheduled non-periodically depending on BS's scheduling.

The sub-S-SFH1 may carry the essential parameters that impact on other sub-S-SFHs' message size. By means of parameters within the sub-S-SFH1, MSs are able to estimate the exact size of other sub-S-SFHs. A possible sub-S-SFH1 message format is defined in Table 2. In the following tables, the term 'TBD' means that an optimum value shall be decided in future and may replace the places.

TABLE 2

| Syntax | Size (bit) | Notes |
|---|---|---|
| sub-S-SFH1_message( ) { | | |
| BS type | 2 | |
| Number of BS antennas | 2 | |
| Number of frequency partitioning (FPCT_DL) for DL | 2 | |
| Number of frequency partitioning (FPCT_UL) for UL | 2 | |

TABLE 2-continued

| Syntax | Size (bit) | Notes |
|---|---|---|
| Same Target IoT Indicator (STII) for UL frequency partitions | 1 | |
| Number of paging groups | TBD | |
| DL/UL ratio | 4 | |
| Duplex mode | 1 | 0b0: TDD |
| | | 0b1: FDD/H-FDD |
| } | | |

The sub-S-SFH2 may carry the essential system parameters related to the basic configuration for transmission. A possible sub-S-SFH2 message format is defined in Table 3.

TABLE 3

| Syntax | Size (bit) | Notes |
|---|---|---|
| sub-S-SFHZ_message( ) { | | |
| CP size | 2 | |
| TTG | 16 | |
| RTG | 8 | |
| System bandwidth | 3 | |
| PHY version information | 3 | |
| MAC version information | 3 | |
| NSP ID | 16 | |
| Network entry enabling | 1 | |
| USCCH 'n' | 2 | |
| HARQ related information | TBD | |
| if (Duplex mode == 0b1) { | | |
| UL center frequency | 2 | |
| UL bandwidth | 4 | |
| } | | |
| for (i=0; i<Number of paging groups; i++) { | | |
| Paging group ID | TBD | |
| } | | |
| } | | |

The sub-S-SFH3 may carry the parameters related to bandwidth request and ranging. A possible sub-S-SFH3 message format is defined in Table 4.

TABLE 4

| Syntax | Size (bit) | Notes |
|---|---|---|
| sub-S-SFH3_message( ) { | 2 | |
| BR channel allocation periodicity | TBD | |
| BR sub-frame allocation bitmap | 7 | |
| BR resource start offset | 3 | |
| BR resource frequency duration | 10 | |
| Initial / final backoff window size (for BR, Periodic/ Initial ranging) | TBD | |
| Ranging channel format | TBD | Ranging channel |
| Preamble information | TBD | for non-synchro- |
| Time/frequency allocation | TBD | nized AMSs |
| Ranging channel format | TBD | Ranging channel |
| Preamble information | TBD | for synchronized |
| Time/frequency allocation | TBD | AMSs |
| } | | |

The sub-S-SFH4 may carry the parameters related to downlink/uplink (DL/UL) resource configuration, UL FFR & power control configuration. A possible sub-S-SFH4 message format is defined in Table 5.

TABLE 5

| Syntax | Size (bit) | Notes |
|---|---|---|
| sub-S-SFH4_message( ) { | | |
| Number of reserved subbands ($K_{SB\_DL}$) for DL | 5 | |
| if (FPCT_DL != 00) { | | |
| Frequency partition size (FPS_DL) for DL | 6 | |
| Frequency partition subband count (FPSC_DL) for DL | 4 | |
| } | | |
| for (i=0; i<FPCT_DL; i++) { | | FPCT_DL = {1,2,3 4} |
| CRU/DRU allocation information for DL | [6] | |
| } | | |
| Number of reserved subbands ($K_{SB\_UL}$) for UL | 5 | |
| if (FPCT_UL != 00) { | | |
| Frequency partition size (FPS_UL) for UL | 6 | |
| Frequency partition subband count (FPSC_UL) for UL | 4 | |
| } | | |
| for (i=0; i<FPCT_UL; i++) { | | FPCT_UL={1,2,3, 4} |
| CRU/DRU allocation information for UL | [6] | |
| } | | |
| Default target IoT level for UL frequency partitions | 4 | |
| if (FPCT_UL == 00) { | | |
| Adjustment of target IoT value | 3 | |
| } | | |
| else { | | |
| if (STII == 0) { | | |
| for (i=0; i<FPCT_UL; i++) { | | |
| Adjustment of target IoT value | 3 | |
| } | | |
| } | | |
| else { | | |
| Adjustment of target IoT value | 3 | |
| } | | |
| } | | |
| } | | |

The sub-S-SFH5 may carry the information of paging indication. A possible sub-S-SFH5 message format is defined in Table 6.

TABLE 6

| Syntax | Size (bit) | Notes |
|---|---|---|
| sub-S-SFH5_message( ) { | | |
| for (i=0; i<Number of paging groups; i++) { | | |
| Paging group ID | TBD | |
| Paging indicator | 4 | Indication per frame |
| } | | |
| } | | |

The sub-S-SFH6 may carry the additional broadcast scheduling information. The sub-S-SFH6 message format is defined in Table 7.

TABLE 7

| Syntax | Size (bit) | Notes |
|---|---|---|
| sub-S-SFH6_message( ) { | | |
| Additional scheduling information | TBD | bitmap |
| Start position | TBD | |
| } | | |

For the transmission of the P-SFH and S-SFH, CRC bits, e.g., 16 bits, are appended to the P-SFH information bits and S-SFH information bits, respectively. For the S-SFH, CRC bits can be appended in each sub-S-SFH. Each CRC-added information bits are FEC-encoded, i.e., each CRC-added information bits are encoded by a forward error correction (FEC) method. The FEC-encoded bits are modulated by quadrature phase shift keying (QPSK). For frequency reuse factor 1 case, the coding rate for the P-SFH and S-SFH may be 1/16. Preferably, the code rate for the P-SFH and S-SFH is 1/16 or less.

Modulated symbols with a fixed MCS can be allocated in time-frequency domain. The physical (PHY) structure for resource allocation of the P-SFH and S-SFH also is described in DL PHY Section of the 802.16m amendment. For mapping modulated symbols to logical resource units (LRUs), the remaining sub-carriers in the last LRU can be padded by zero values for both P-SFH and S-SFH LRU mapping, respectively.

When contiguous resource units (CRUs) are multiplexed with distributed resource units (DRUs) in frequency domain, it is impossible to locate physical resource units (PRUs) only with the help of a logical index indication. Therefore, it is necessary to pre-define a resource allocation scheme in consideration of a SFH for a sub-frame in which a SFH exists. The resource allocation scheme may include a process of permutation, a process of partitioning the available resources, and a process of reserving the size and location of a SFH.

A distributed resource allocation should be applied for a SFH to get a diversity gain for the transmission of the SFH. However, if a SFH is multiplexed with a data channel in a sub-frame in FDM manner and if the resource allocation for the SFH is needed to be pre-defined, it is difficult to apply the same distributed permutation rule as is applied to the data channel to the SFH. This is because the resource location of a SFH is required to be pre-defined. Therefore, to transmit a SFH, it is necessary to define a new resource allocation for a sub-frame including a SFH, which is different from the permutation rule of other sub-frames not including a SFH.

One of the purposes of the present invention is to provide a resource allocation method for a SFH such that a distributed resource allocation is applied to the SFH to get a diversity gain, and the location of the SFH is pre-defined.

Contiguous resource units (CRUs) can be allocated for a SFH, and a distributed resource allocation method, which is different from the distributed resource allocation method for distributed resource units (DRUs) for a data channel, can be applied for the SFH. That is, although CRUs are allocated to a SFH for resource assignment, the CRUs are used not for a localized user but for resource units for the SFH. In this way, the number of DRUs allocated to the user for which a distributed permutation rule is applied can remain constant at least for a superframe including a predetermined number of sub-frames, and the same distributed permutation rule can be applied to the data portion of each sub-frame of the superframe.

Otherwise, DRUs can be allocated for the SFH, and a distributed resource allocation method, which is different from the distributed resource allocation method for distributed resource units (DRUs) for a data channel, can be applied for the SFH. In this case, it may not be possible to apply the same distributed permutation rule for all sub-frames in a superframe.

The resources for a SFH may be allocated with a granularity of N1 PRUs, hereinafter also called as N1 sub-band granularity or sub-band granularity, or with a granularity of N2 PRUs, hereinafter also called as N2 granularity or mini-band granularity. The N1 PRUs and the N2 PRUs are contiguous in physical frequency domain. The number N1 is greater than the number N2. Further, preferably N1 is set to 4 and N2 is set to 1.

The resources for a SFH can be pre-defined or pre-reserved in a unit of a predetermined number of PRUs after the permutation with the N1 granularity has been performed, or when a permutation for the whole frequency partition is performed for the resource region left over after a permutation with the N1 granularity. The pre-reserved or pre-defined resources for the SFH may be distributed with a uniform gap in a frequency partition, part of the whole frequency partition, or the whole frequency partition.

Otherwise, the resources for the SFH can be pre-reserved or pre-defined with the N1 or N2 granularity before performing any permutation.

According to the present invention, the resources for a SFH may be pre-defined in units of N1 PRUs, in other words, with a granularity of N1 PRUs. Hereinafter, the granularity of N1 PRUs is also referred to as 'sub-band granularity', and the process of permuting the physical resources with sub-band granularity is also called as 'sub-band partitioning'. Preferably, N1 equals 4.

The process of pre-reserving the resources with the N1 sub-band granularity is applied with the highest priority in the resource allocation procedure. Accordingly, the process of pre-reserving the resources with the N1 sub-band granularity is applied before the sub-band partitioning.

If N2 mini-band granularity is applied for pre-reserving the SFH, the same permutation rule as is used for a data channel can be used for the SFH. When N2 mini-band granularity is used, the SFH can be distributed over physical resource units. If the SFH is distributed over physical resource units, the interval between each distributed resource of the SFH may be set to a multiple of N1 PRUs. In this way, the remaining physical resource units can be effectively reserved for resource allocation with N1 sub-band granularity.

In other ways, Equation 1 regarding the sub-band partitioning, which is dependent of the number of resource units of a SFH, may be applied to the pre-defining method.

$$P[i] = \left[ \text{Offset}_{SFH} + \text{floor}\left(\frac{N_{subband}}{N_{SFH\_RU}}\right) \cdot i \right] \bmod N_{subband} \quad \text{[Equation 1]}$$

$$i = 0, 1, 2, \ldots, N_{SFH\_RU} - 1$$

where, $\text{Offset}_{SFH}$ denotes the starting sub-band position of SFH resource allocation (0, 1, 2, ..., and default=0), $N_{subband}$ denotes the number of sub-band with N1 granularity, $N_{SFH\_RU}$ denotes the number of used resource units for SFH, and P[i] denotes the position of $i^{th}$ allocated SFH resource unit based on the N1 granularity.

In Equation 1, if $N_{SFH\_RU}$ is greater than $N_{subband}/2$, it is difficult to equally distribute the sub-bands for the SFH. In this case, Equation 1 can be modified to Equation 2 by adding additional factor Q[i].

$$P[i] = \left[ \text{Offset}_{SFH} + \text{floor}\left(\frac{N_{subband}}{N_{SFH\_RU}}\right) \cdot i + Q[i] \right] \bmod N_{subband} \quad \text{[Equation 2]}$$

$$i = 0, 1, 2, \ldots, N_{SFH\_RU} - 1$$

where, Q[i] denotes a predefined equation or index values from a predefined table.

After the above mentioned process of allocating resources with the N1 sub-band granularity, in the SFH resource region, the SFH resources may be allocated in a pre-defined manner in units of N2 PRUs, and this can be done by a distributed resource allocation method. The same conventional data permutation rule as is used for a data channel may be applied to a SFH. Otherwise, a distributed allocation method may be applied such that the resources for the SFH are uniformly distributed in frequency domain.

According to one embodiment of the present invention, the rule for SFH resource allocation may be independent of the rule for data resource allocation.

FIG. 1 shows an exemplary resource allocation rule for a SFH according to one embodiment of the present invention.

Referring to FIG. 1, the permutation rule for a SFH is applied separately from the permutation rule for a data channel. For the resource allocation for a SFH, it applies the same permutation rule in PHY structure for data, after SFH predefining process. For the resource allocation for a data channel, it applies the same permutation rule in PHY structure for data, after SFH predefining process. In FIG. 1, the resources are pre-reserved in physical domain to be restricted within a contiguous physical frequency bandwidth of 5 MHz.

According to another embodiment of the present invention, the rule for SFH resource allocation may be of the same as the rule for data resource allocation.

Figure 2:
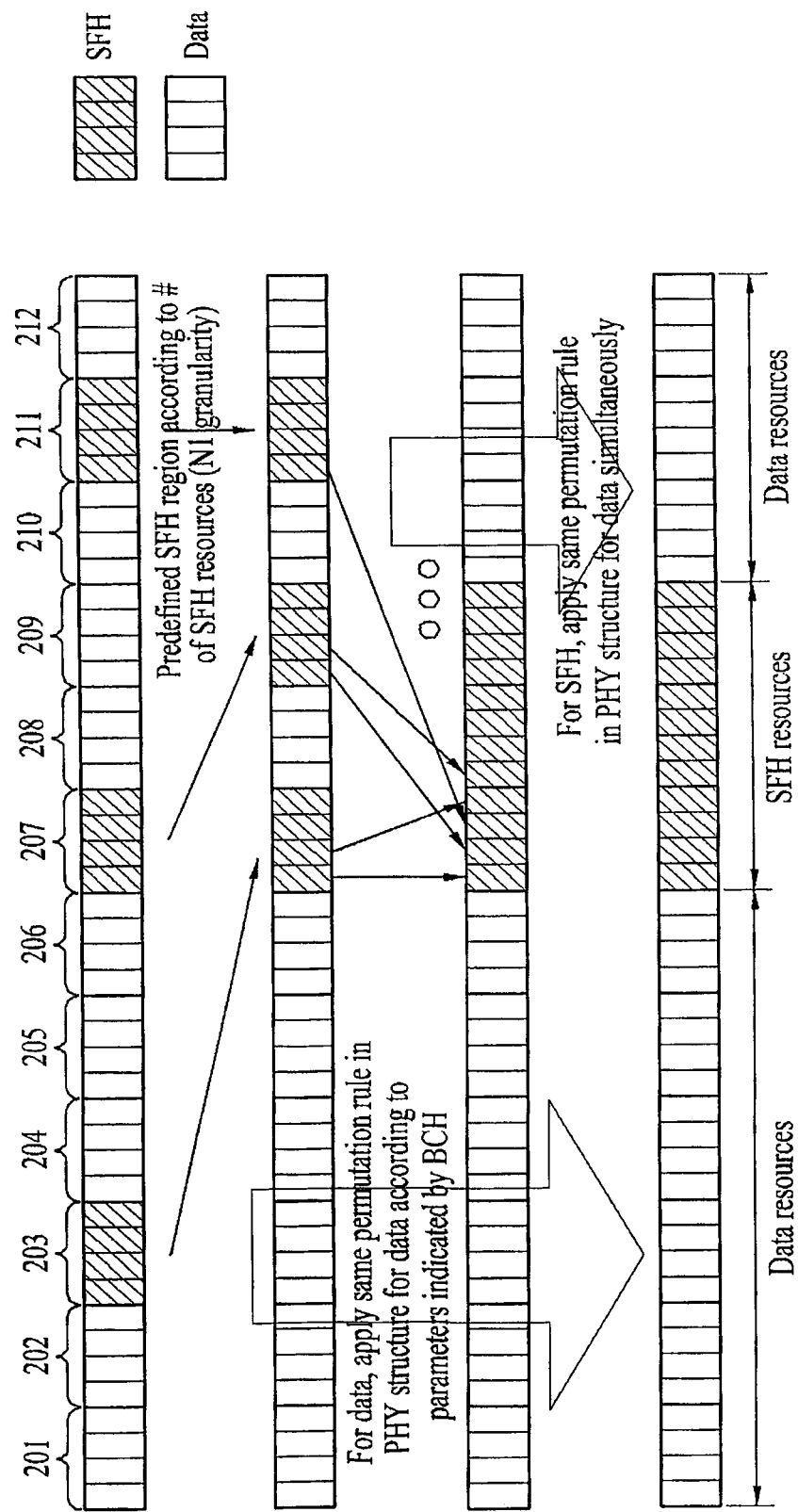
FIG. 2 shows an exemplary resource allocation rule for SFH according to another embodiment of the present invention.

FIG. 2 shows an exemplary resource allocation rule for SFH according to another embodiment of the present invention.

Referring to FIG. 2, the resource allocation rule for SFH is applied simultaneously with the resource allocation rule for data. For SFH resource allocation, it applies the same permutation rule in PHY structure for data, after SFH predefining process. For Data resource allocation, it applies the same permutation rule in PHY structure for data, after SFH predefining process. Unlike FIG. 1, the resource for the SFH is distributed over the whole system bandwidth after conducting the permutation rule. [ ] Although FIG. 1 depicts that the physical resources for the SFH are spread over the whole system bandwidth with a granularity of a resource unit, the physical allocation of the SFH is not restricted to this. That is, if the same permutation rule is applied both for the logical resources of data and the logical resources of the SFH, the physical resources for the SFH may be spread over the whole system bandwidth with a finer granularity, such as with a granularity of a sub-carrier granularity or a granularity of tone pair wise sub-carriers.

Relating FIG. 2 with Equation 1, $N_{subband}$ in Equation 1 become 12 for FIG. 2 (refer to 201~212), and $N_{SFH\_RU}$ in Equation 1 become 3 for FIG. 2 (refer to 203, 207, and 211).

A data permutation rule may be applied for the data resource units located outside the SFH resource region. According to the present invention, the physical bandwidth for SFH resource allocation may be limited within 5 MHz bandwidth which is the same as the size of the bandwidth used by a SCH. In this case, the SFH predefining method can be given by Equation 3 regarding the sub-band partitioning.

$$P[i] = \left[ \text{Offset}_{SFH} + \text{floor}\left(\frac{(N_{subband}) \bmod N_{5MHz\text{-}subband}}{N_{SFH\_RU}}\right) \cdot i \right] \quad \text{[Equation 3]}$$

$$\bmod N_{subband}$$

$$i = 0, 1, 2, \ldots, N_{SFH\_RU} - 1$$

where, $\text{Offset}_{SFH}$ denotes the starting subband position of SFH resource allocation (0, 1, 2, . . . , and default=3), $N_{subband}$ denotes the number of subband (N1 granularity), $N_{SFH\_RU}$ denotes the number of used resource units for SFH, $N_{5\ MHz-subband}$ denotes the number of subband for 5 MHz bandwidth (N1 granularity), and P[i] denotes the position of $i^{th}$ allocated SFH resource unit based on the N1 granularity.

In Equation 3, if $N_{SFH\_RU}$ is greater than $N_{subband}/2$, it is difficult to equally distribute the sub-bands for a SFH. In this case, Equation 3 can be modified to Equation 4 by adding additional factor Q[i].

$$P[i] = \left[\text{Offset}_{SFH} + \text{floor}\left(\frac{(N_{subband}) \bmod N_{5MHz-subband}}{N_{SFH\_RU}}\right) \cdot i + Q[i]\right] \bmod N_{subband} \quad [\text{Equation 4}]$$

$$i = 0, 1, 2, \ldots, N_{SFH\_RU} - 1$$

where, Q[i] denotes a predefined equation or index values from a predefined table.

Otherwise, the bandwidth for SFH resource allocation may extend to the whole bandwidth.

The number of sub-bands with the N1 sub-band granularity for a sub-frame including a SFH may be different from the number of sub-bands for another sub-frame not including a SFH. The sub-frame including a SFH may inform a user equipment of the number of sub-bands which will be used for following sub-frames as well as of the information about the ratio of CRUs to DRUs (or about the amount of resource units). Also, a SFH can inform a user equipment of information about the SFH resource region which is used in the subsequent sub-frame having a SFH. The information may include the number of sub-bands and/or the number of the used PRUs.

After partitioning the SFH resource region with the sub-band granularity, the SFH resource region can also be grouped into so-called mini-band with the granularity of N2 PRUs.

The same method as the distributed resource allocation method used for a data permutation rule may be applied to the resource allocation for a SFH. Otherwise, a distributed allocation method may be applied such that the resources for the SFH are uniformly distributed in frequency domain. The pre-defined SFH resource region may be limited either within a frequency partition or within a plurality of frequency partition. The resource allocation rule is applied to both the sub-frame including a SFH and the sub-frames not including a SFH in a single superframe. A SFH may include information about the number of sub-bands or the number of PRUs used for the SFH of the next superframe.

Hereinafter, a resource allocation method according to the present invention is provided for a configuration that a SFH is composed of a P-SFH and a S-SFH as mentioned above. The P-SFH and S-SFH may be transmitted in a predefined partition defined by a configuration of a SFH frequency partitioning which is different from the frequency partitioning in other sub-frames. Preferably, the PRUs of the frequency partition used for the P-SFH and S-SFH transmission span within the minimum bandwidth of 5 MHz. After predefining SFH resource unit allocation, the transmission of the sub-frame including a SFH is performed with the same rule as other sub-frames not including a SFH. The P-SFH and the S-SFH may use distributed resource units.

The resources for the P-SFH may be pre-reserved with a granularity of N1 PRUs (i.e. N1 sub-band granularity) or with a granularity of N2 PRUs.

If the resources for the P-SFH are pre-reserved with the N1 sub-band granularity, the resources pre-reserved by N1 granularity may be resource-allocated, after the pre-reserving process, with the highest priority in the subsequent resource allocating procedure.

Otherwise, if the resources for the P-SFH are pre-reserved with the granularity of N2 PRUs, the resources pre-reserved by N2 granularity may be resource-allocated with the highest priority in the subsequent resource allocating procedure. In this case, the number of PRUs used for a P-SFH should be determined to have a multiple of 4, or to have the number of PRUs contiguously allocated in a sub-band, or to have a multiple of the number of PRUs contiguously allocated in a sub-band, so as not to affect the sub-band partitioning for the remaining data region. That is, the number of predefined PRUs for a P-SFH should be determined to have the number of contiguous PRUs in a sub-band, or to have a multiple of the number of contiguous PRUs in a sub-band, or should have N1 sub-band granularity or should maintain PRU spacing of a multiple of 4.

Figure 3:
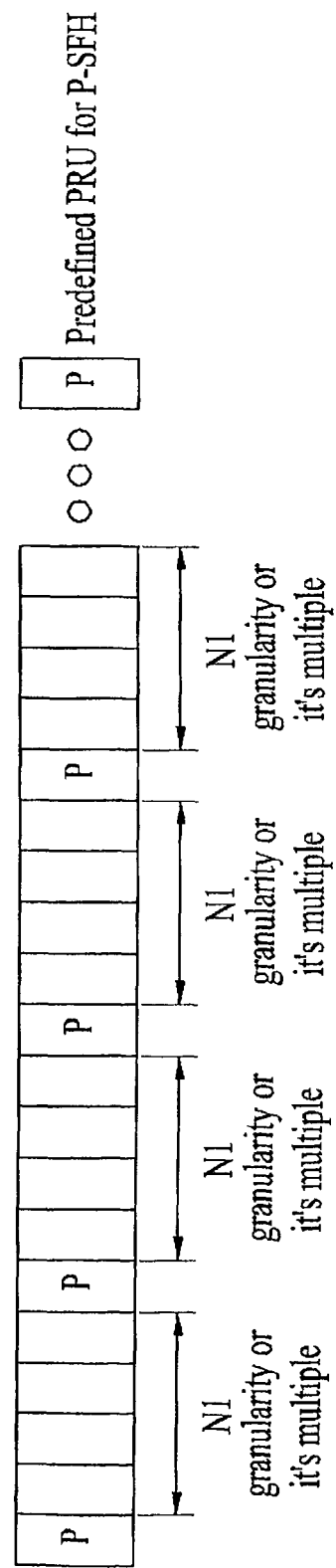
FIG. 3 shows an exemplary resource allocation for a P-SFH according to one embodiment of the present invention.

FIG. 3 shows an exemplary resource allocation for a P-SFH according to one embodiment of the present invention. Referring to FIG. 3, the predefined PRUs for a P-SFH is allocated every N1 resource units or every multiple of N1 resource units.

Preferably, the same resource allocation scheme for P-SFH is applied for every sub-frame including a SFH.

The same method as the distributed resource allocation method used for a data permutation rule may be applied to the resource allocation for a P-SFH. Otherwise, a distributed allocation method may be applied such that the resources for the P-SFH are uniformly distributed in frequency domain. In other ways, Equation 5 regarding the sub-band partitioning, which is dependent of the number of resource units of a P-SFH, may be applied to the pre-defining method.

$$P[i] = \left[\text{Offset}_{P\text{-}SFH} + \text{floor}\left(\frac{N_{subband}}{N_{P\text{-}SFH\_RU}}\right) \cdot i\right] \bmod N_{subband} \quad [\text{Equation 5}]$$

$$i = 0, 1, 2, \ldots, N_{P\text{-}SFH\_RU} - 1$$

where, $\text{Offset}_{P\text{-}SFH}$ denotes the starting subband position of P-SFH resource allocation (0, 1, 2, . . . , and default=0), $N_{subband}$ denotes the number of subband (N1 granularity), $N_{P\text{-}SFH\_RU}$ denotes the number of used resource units for P-SFH, and P[i] denotes the position of $i^{th}$ allocated P-SFH resource unit based on the N1 granularity.

In Equation 1, if $N_{P\text{-}SFH\_RU}$ is greater than $N_{subband}/2$, it is difficult to equally distribute the sub-bands for a SFH. In this case, Equation 1 can be modified to Equation 2 by adding additional factor Q[i].

$$P[i] = \left[\text{Offset}_{P\text{-}SFH} + \text{floor}\left(\frac{N_{subband}}{N_{P\text{-}SFH\_RU}}\right) \cdot i + Q[i]\right] \bmod N_{subband} \quad [\text{Equation 6}]$$

$$i = 0, 1, 2, \ldots, N_{P\text{-}SFH\_RU} - 1$$

where, Q[i] denotes a predefined equation or index values from a predefined table.

A data permutation rule may be applied for the data resource units located outside the P-SFH resource region. The bandwidth for P-SFH resource allocation may be limited to the same size as 5 MHz bandwidth for a SCH. In this case, the P-SFH predefining method can be given by Equation 7 regarding the sub-band partitioning.

$$P[i] = \left[ \text{Offset}_{P\_SFH} + \text{floor}\left(\frac{N_{5MHz\_subband}}{N_{P\_SFH\_RU}}\right) \cdot i \right] \mod N_{subband} \quad \text{[Equation 7]}$$

$$i = 0, 1, 2, \ldots, N_{P\_SFH\_RU} - 1$$

where, $\text{Offset}_{P\_SFH}$ denotes the starting subband position of P-SFH resource allocation (0, 1, 2, ..., and default=3), $N_{subband}$ denotes the number of subband (N1 granularity), $N_{P\_SFH\_RU}$ denotes the number of used resource units for P-SFH, $N_{5\ MHz\_subband}$ denotes the number of subband for 5 MHz bandwidth (N1 granularity), and P[i] denotes the position of allocated P-SFH resource unit based on the N1 granularity.

In Equation 7, if $N_{P\_SFH\_RU}$ is greater than $N_{subband}/2$, it is difficult to equally distribute the sub-bands for a SFH. In this case, Equation 7 can be modified to Equation 8 by adding additional factor Q[i].

$$P[i] = \text{Offset}_{P\_SFH} + \left[ \text{floor}\left(\frac{(N_{subband}) \mod N_{5MHz\_subband}}{N_{P\_SFH\_RU}}\right) \cdot i + Q[i] \right] \mod N_{subband} \quad \text{[Equation 8]}$$

$$i = 0, 1, 2, \ldots, N_{P\_SFH\_RU} - 1$$

where, Q[i] denotes a predefined equation or index values from a predefined table.

According to the present invention, a data permutation rule is applied to data resource units and a S-SFH which are located out of the P-SFH resource region, and the rule for P-SFH resource allocation may be independent of the rule for data resource allocation.

Figure 4:
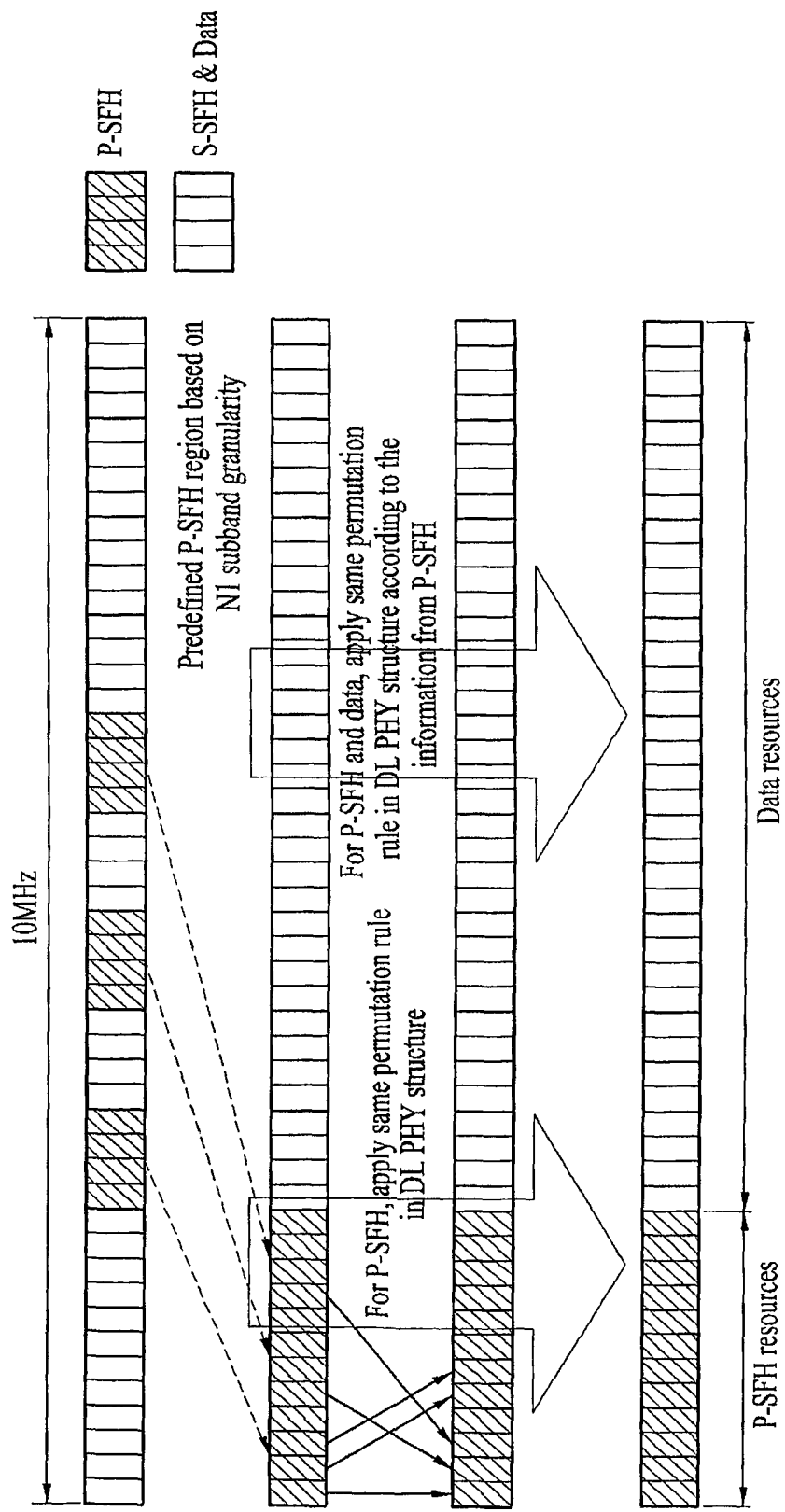
FIG. 4 shows an exemplary resource allocation rule for P-SFH according to one embodiment of the present invention.

FIG. 4 shows an exemplary resource allocation rule for P-SFH according to one embodiment of the present invention.

Referring to FIG. 4, the resource allocation rule for P-SFH is applied separately from the resource allocation rule for data. For P-SFH resource allocation, it applies the same permutation rule in PHY structure for data, after P-SFH predefining process. For Data resource allocation, it applies the same permutation rule in PHY structure for data, after P-SFH predefining process.

The P-SFH may indicate resource allocation information about the S-SFH and data to allocate resources for the sub-frame including a SFH. The resource allocation information includes at least one of resource location information, the number of resource units, logical indexes of resources, frequency partitioning information, etc.

According to an embodiment of the present invention, the P-SFH is predefined to have the granularity of N1 PRUs, which is also called sub-band granularity, with the highest priority. Mobile terminals may have prior information about the predefined P-SFH in advance. The information may have at least one of resource location information, the number of resource units, logical indexes of the resources, and a predefined configuration of frequency partitions.

The P-SFH may indicate information about the S-SFH. The information may include at least one of resource location information, the number of resource units, logical indexes of the resource units, frequency partitioning configuration, and the number of resource units per frequency partition. The P-SFH may be predefined to have the same location and the same size (or the same logical indexes) at every sub-frame including a SFH. Also, the S-SFH may be predefined to have the same location and the same size (or the same logical indexes) at every sub-frame including a SFH, or may be changed in the size or location based on the information indicated by the P-SFH. The above mentioned number N1 for P-SFH can be selected from a set of {4, 8, 12, 16, 20, 24}. Preferably, N1 is 4. The set may be determined to have fixed values of elements irrespective of system bandwidth.

When flexible frequency reuse (FFR) scheme is used, the SFH can be pre-reserved for the region of frequency reuse factor 1 and/or the region of frequency reuse factor N (N=2, 3, 4, ...). Preferably, the N1 sub-band granularity is used for the region of frequency reuse factor 1 and the N2 granularity is used for the region of frequency reuse factor N (N=2, 3, 4, ...).

FIG. 5 shows an exemplary logical domain indexing for P-SFH, S-SFH, and data, for a SFH in frequency reuse factor 1 region.

In FIG. 5, the logical index number of the P-SFH always starts from 0 (zero). Otherwise, the logical index number of the P-SFH may start from a predefined offset number. The offset number can be determined according to the given frequency partition configuration. In other words, the logical index number of the P-SFH is the lowest logical index of the total bandwidth or a certain frequency partition. In FIG. 5, N_P-SFH indicates the number of P-SFH logical resource units (LRUs), N_S-SFH indicates the number of S-SFH LRUs, N_LRU indicates the number of LRUs depending on bandwidth. N_LRU may be equal to 24 for 5 MHz bandwidth, 48 for 10 MHz bandwidth, and 96 for 20 MHz bandwidth. P-SFH logical index numbers may have one of values from Offset to (Offset+N_P-SFH-1), S-SFH logical index numbers may have one of values from (Offset+N_P-SFH) to (Offset+N_P-SFH+N_S-SFH-1), and data logical index numbers may have one of values from (Offset+N_P-SFH+N_S-SFH) to N_LRU-1. Offset is a non-negative integer value, and the default value of Offset is preferably set to 0 (zero) if the system has one frequency partition in the sub-frame that contains a SFH.

FIG. 6 shows an exemplary logical domain indexing for P-SFH, S-SFH, and data, for a SFH in frequency reuse factor N region (N is a natural number greater than 1).

In FIG. 6, the logical index number of P-SFH always starts from 0 (zero). Otherwise, the logical index number of P-SFH may start from a predefined offset number Offset. The offset number can be determined according to the given frequency partition configuration. In other words, the logical index number of the P-SFH is the lowest logical index of the total bandwidth or a certain frequency partition. In FIG. 6, Sum (L_Partition_k) denotes the total number of LRUs from Partition 1 to Partition k. The P-SFH logical index numbers start from Offset in Partition 1, Offset+Sum(L_Partition_1) in Partition 2, Offset+Sum(L_Partition_2) in Partition 3, and so on. An Offset is a non-negative integer value, and the default value of Offset is preferably set to 0 (zero).

FIG. 7 shows another exemplary logical domain indexing of P-SFH, S-SFH, and data, for a SFH in frequency reuse factor N region (N is a natural number greater than 1).

FIG. 7 is a special case of FIG. 6 where Offset is set to 0 (zero). In FIG. 7, the logical index number of P-SFH always starts from 0 (zero), Sum(L_Partition_k) denotes the total number of LRUs from Partition 1 to Partition k, N_N1 denotes the number of PRUs in a sub-band, and the P-SFH logical index numbers are given as 0, 1, . . . , N_N1-1, Sum(L_Partition_1), Sum(L_Partition_1)+1, Sum(L_Partition_1)+N_N1-1, Sum(L_Partition_2), Sum(L_Partition_2)+1, . . . , Sum(L_Partition_2)+N_N1-1.

Figure 8:
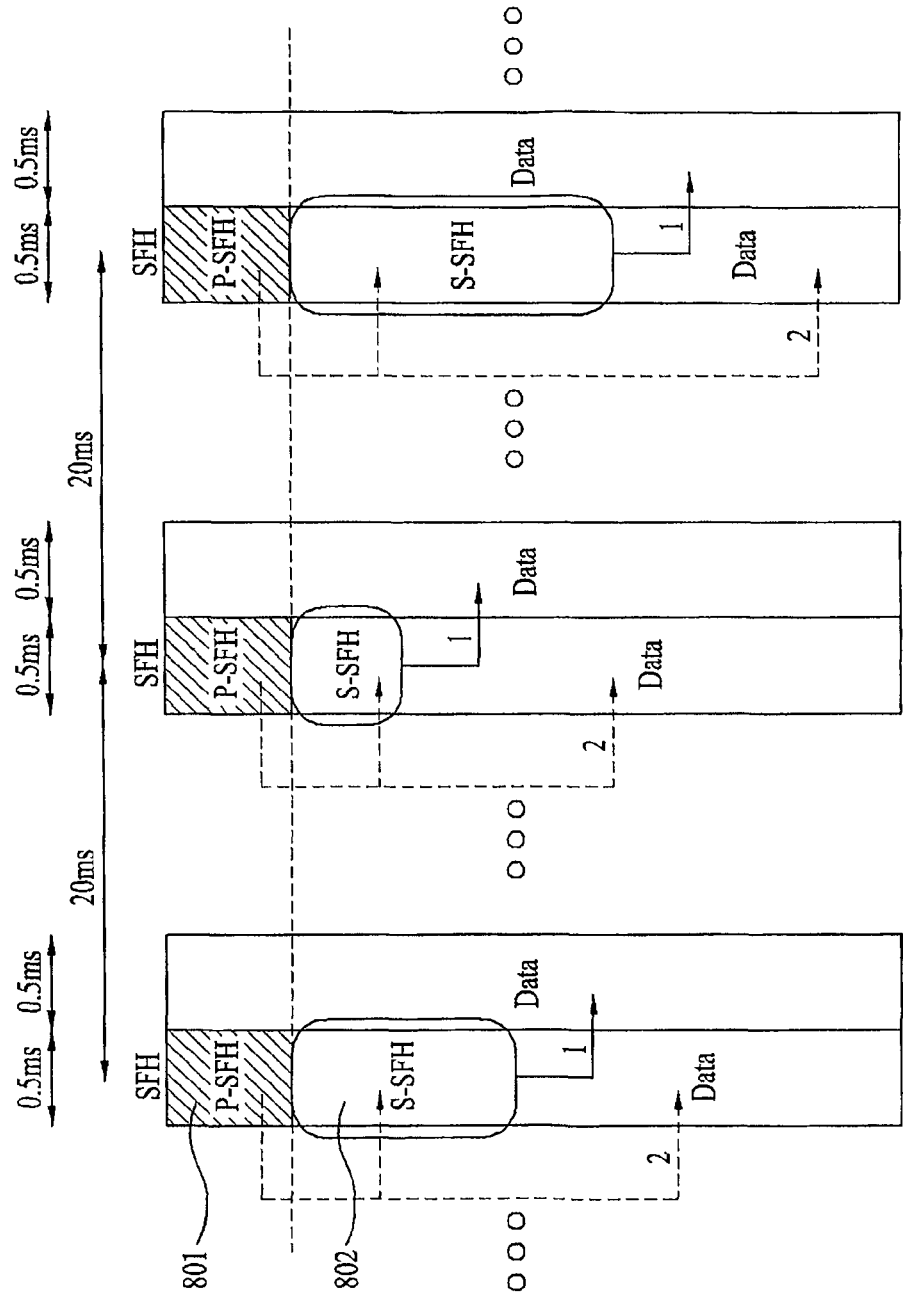
FIG. 8 shows an exemplary overall SFH resource allocation process according to one embodiment of the present invention.

FIG. 8 shows an exemplary overall SFH resource allocation process according to one embodiment of the present invention. The frequency bandwidth of FIG. 8 may extend more than a minimum 5 MHz.

Referring to FIG. 8, the P-SFH 801 indicates the resource allocation information of the S-SFH 802 and the data region for the sub-frame including the SFH (dashed line 2), and the S-SFH 802 indicates the resource allocation information of the data region for the following sub-frames not including the SFH (solid line 1). According to this embodiment, the SFH is transmitted every 20 ms, in other words, every superframe of 20 ms. In addition, the time span of a SFH is 0.5 ms, in other words, is equal to the time length of a sub-frame.

Figure 9:
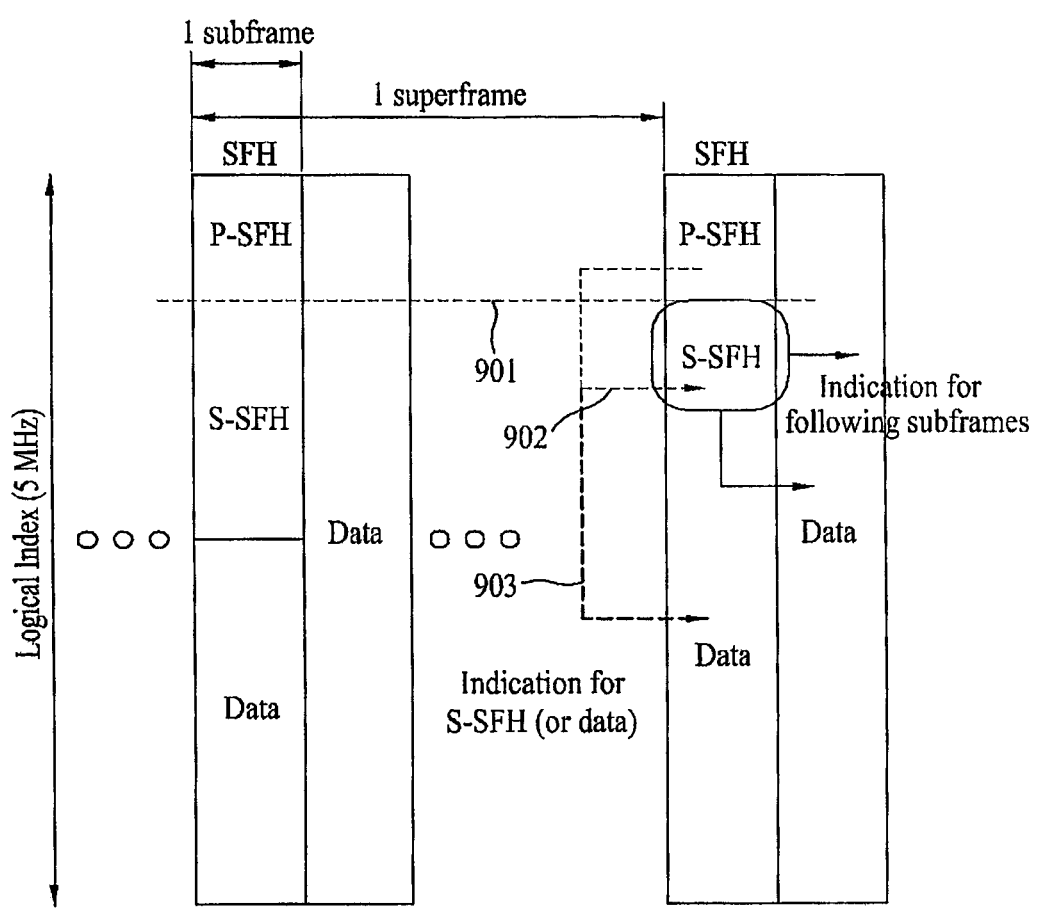
FIG. 9 shows an exemplary resource allocation structure including a SFH within a minimum 5 MHz bandwidth.

FIG. 9 shows an exemplary resource allocation structure including a SFH within a minimum 5 MHz bandwidth. FIG. 9 also can be understood as an illustration showing only the minimum 5 MHz bandwidth of FIG. 8.

Referring to FIG. 9, a superframe is comprised of a plurality of sub-frames. One of the sub-frames in the superframe may include a SFH. The sub-frame including the SFH comprises the resource units for a P-SFH, the resource units for a S-SFH, and the resource units for data. Other sub-frames not including the SFH comprise only the resource units for data.

When designing resource allocation for SFH, following requirements should be taken into consideration:

(1) The uncertainty of the system bandwidth in initial access stage should be resolved.

(2) A MS can be informed of a system bandwidth with the help of a SCH using a signal correlation method, but there are high chances of error in this method. Therefore, when the MS is not informed of the system bandwidth by a signaling message, the MS should try to perform blind decoding for all the possible bandwidths to find the system bandwidth if the bandwidth for a SFH is not pre-defined.

(3) A sub-frame with a SFH should have a partitioning configuration that is different from that of other data sub-frames not including a SFH.

According to the present invention, the size of the P-SFH is fixed (refer to dashed line 901) or predefined with being located in the predefined PRUs or sub-bands. The proper size of the P-SFH may be given as one of 4 PRUs, 8 PRUs, and 12 PRUs, or may be given as one of 1 sub-band, 2 sub-bands, and 3 sub-bands. Herein, 1 sub-band is preferably comprised of 4 resource units, though not restricted to this. In addition, based on the above considerations, the PRU location of the P-SFH should be predetermined within the minimum bandwidth, e.g., 5 MHz if the minimum bandwidth supported by a MS is 5 MHz, irrespective of the total system bandwidth. The predefined PRUs or sub-bands for the P-SFH may be mapped to logical resource units starting from the lowest logical indexing number including logical index 0 (zero). Because the size of P-SFH is fixed, the logical resource units following the logical resource units allocated for the P-SFH are allocated to the S-SFH without indicating the starting point of S-SFH. For example, if the logical index of the P-SFH starts from 0 and ends at N_P-SFH-1, then the logical index of the S-SFH starts from N_P-SFH. Therefore, the P-SFH may just indicate the size of the logical resource units for the P-SFH without indicating the start point of the S-SFH.

The S-SFH has a variable size which is indicated by the P-SFH. Referring to FIG. 9, the P-SFH indicates resource allocation information 902 for the S-SFH or allocation information 903 for the data within the sub-frame including the SFH. The location of S-SFH should be within 5 MHz as like the P-SFH from the following reasons:

(1) to support MSs with 5 MHz system bandwidth.

(2) to enhance the SFH performance/coverage through SCH channel estimation aid.

The same permutation rule as is applied to other sub-frames not including a SFH may be applied for the sub-frame including the P-SFH and S-SFH within the 5 MHz bandwidth.

Figure 10:
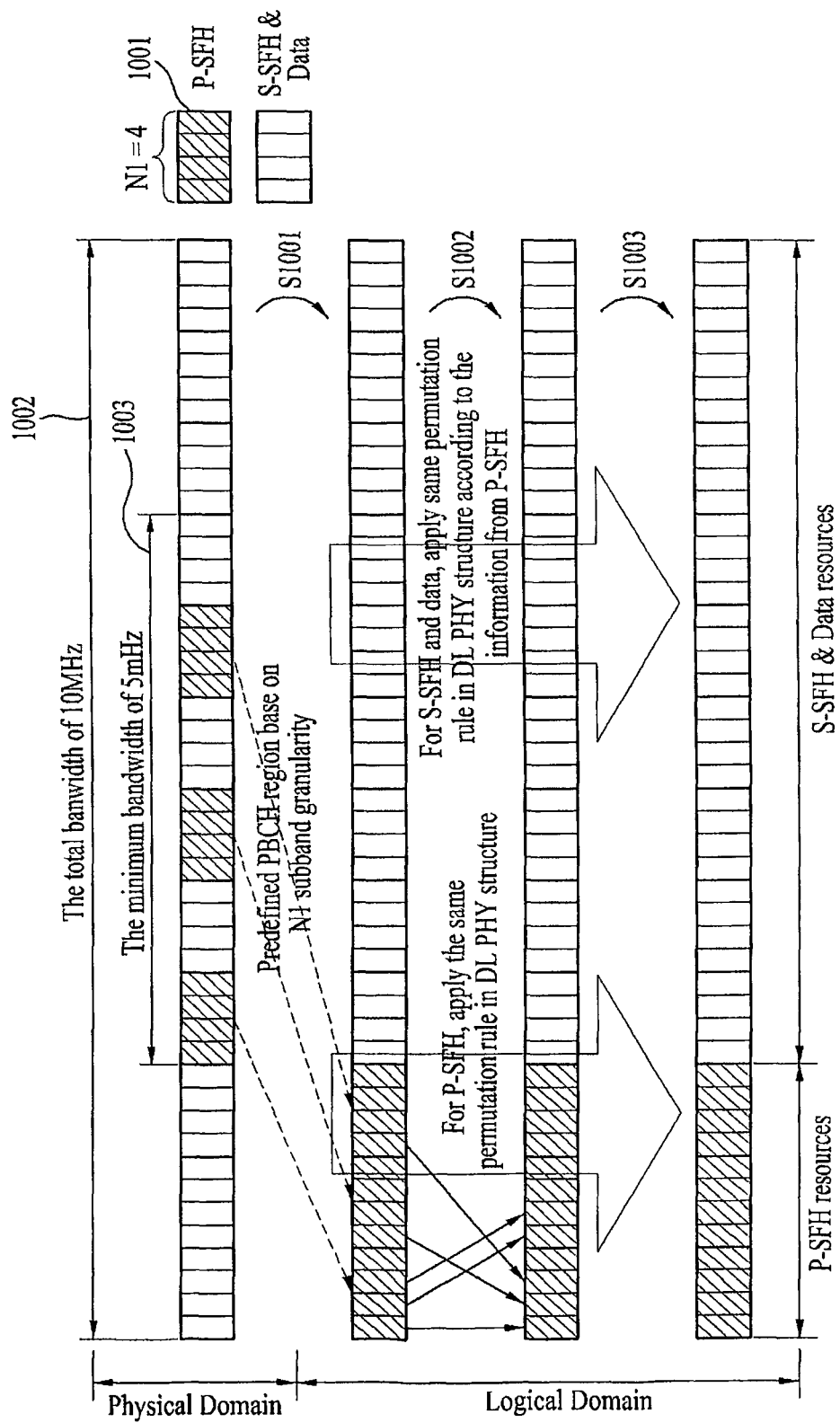
FIG. 10 shows an exemplary sub-carrier to resource mapping rule according to one embodiment of the present invention.

FIG. 10 shows an exemplary sub-carrier to resource mapping rule according to one embodiment of the present invention.

For the mapping rule of FIG. 10, it is assumed that the size of the P-SFH 1001 is fixed based on the N1 granularity, and that the location of the P-SFH is predetermined. In addition, it is further assumed that the P-SFH indicates the resource allocation of the S-SFH such that the size of the S-SFH is limited to the minimum 5 MHz bandwidth.

Referring to FIG. 10, the total system bandwidth is given 10 MHz (refer to 1002), but the P-SFH is within the minimum bandwidth 5 MHz (refer to 1003). In step S1001, a sub-band partitioning is performed for the frequency partition of a P-SFH. In step S1002, a mini-band partitioning is performed for the P-SFH region. The granularity N2 for the mini-band partitioning is less that the granularity N1 of the sub-band partitioning. Preferably, N1 is 4 and N2 is 1. The same permutation rule as is used for a data channel in downlink physical structure is applied to the P-SFH. Likewise, the same permutation rule as is used for a data channel in downlink physical structure is applied to the S-SFH according to the information from the P-SFH. By step S1003, a sub-carrier permutation or a tone-pair wise permutation is performed. A resource block is composed of a predetermined number of sub-carriers. Unlike the sub-band partitioning and/or the mini-band partitioning, the granularity for the sub-carrier permutation or the tone-pair permutation is less than a resource unit. In other words, the granularity for the sub-carrier permutation and the tone-pair permutation is a sub-carrier and a pair of sub-carriers, respectively.

Figure 11:
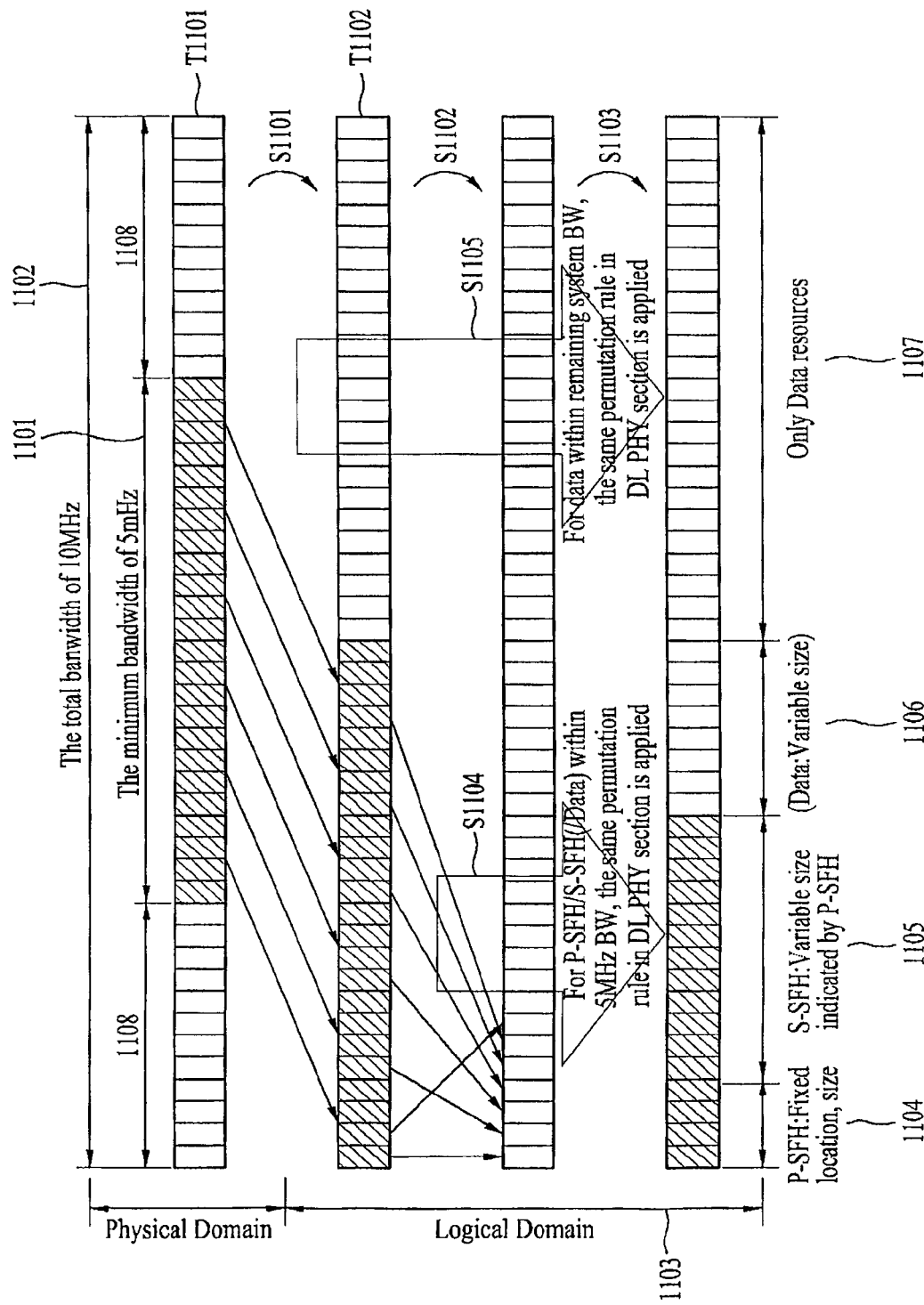
FIG. 11 shows an exemplary sub-carrier to resource mapping rule according to another embodiment of the present invention.

FIG. 11 shows an exemplary sub-carrier to resource mapping rule according to another embodiment of the present invention.

For the resource allocation rule of FIG. 11, it is assumed that a specific continuous physical frequency partition 1101 of a minimum 5 MHz is reserved in stage T1101 for the P-SFH and S-SFH when the total system bandwidth is 10 MHz 1102. If part of the physical frequency partition 1101 is still available after completing the reservation of the P-SFH and S-SFH, the remaining part of physical frequency partition 1101 can be allocated for data. It is apparent that the size of the remaining part is variable. In addition, it is further assumed that the P-SFH indicates the resource allocation of the S-SFH, whose size is also variable, such that the size of the S-SFH is limited to the 5 MHz bandwidth physical frequency partition 1101. However, unlike the resource allocation rule of FIG. 10, the resources for the SFH are not pre-reserved in units of a sub-band. Therefore, any sub-band permutation for the SFH is not conducted by step S1101. It should be noted that FIG. 11 illustrates that physical frequency partition 1101 is simply reserved for the SFH.

Referring to the logical domain 1103 of FIG. 11, the size of the P-SFH 1104 is fixed, and the index numbers of the logical resource units allocated to the P-SFH 1104 are continuous in value. Also, the index numbers of the logical resource units allocated to the S-SFH 1105 are continuous in value, but the size of the S-SFH 1105 is variable. The first logical index number of the S-SFH 1105 immediately follows the last logical index number of the P-SFH 1104. Likewise, the first logical index number of the variable-sized data 1106 immediately follows the last logical index number of the S-SFH 1105. Although the size of the S-SFH 1105 is illustrated variable in FIG. 11, the present invention is not restricted to this, that is, the size of the S-SFH 1105 also can be fixed like the P-SFH 1104.

In stage T1102, the resources for the SFH are reserved with a mini-band granularity, preferably with a granularity of 1 resource unit. Then, a mini-band permutation is conducted by step S1102 with the mini-band granularity for the SFH and optionally for the part of data.

There are two separated permutation processes S1104 and S1105 in the sub-frame with a SFH according to this embodiment. That is, process S1104 is independent on process S1105. Therefore, The permutation rule S1104 for the physical frequency partition 1101, which corresponds to the logical areas 1104, 1105, and 1106, may or may not be different from the other permutation rule S1105 for the remaining frequency partition 1108, which corresponds to the data only resource region 1107.

Lastly, by step S1103, a sub-carrier permutation or a tone-pair wise permutation is performed at least for the physical frequency partition 1101.

According to the present invention, following rules are applied for the permutation related to the SFH bandwidth 1101:

(1) The PRUs within the physically contiguous 5 MHz bandwidth 1101 aligned with primary-synchronization channel (P-SCH) are selected for resource allocation of the P-SFH 1104 and S-SFH 1105 (or data 1106).

(2) In step S1101, a sub-band partitioning process is omitted.

(3) The selected PRUs are permuted based on the mini-band N2 granularity by step S1102 (preferably N2=1). The permutation rule is defined in the downlink physical structure section of IEEE 802.16m amendment. There is only mini-band based permutation.

(4) Finally, the sub-carrier permutation (tone-pair wise) can be applied in step S1103.

To get a diversity gain for the SFH, all resource units are allocated with N2 granularity (or PRU) for the physical frequency partition 1101. There is no sub-band based partitioning for this permutation and all resource units can be applied by distributed LRUs. In this permutation process, the distributed resource allocation may be applied by PRU-based distributed unit (i.e., N2=1), or by pair-tone wise distributed unit.

For the region of the remaining system bandwidth 1108 excluding the predefined 5 MHz bandwidth 1101, the same permutation rule as is applied for other sub-frames not including a SFH is applied according to the indicated information by SFH, while different permutation rule is provided for the physical frequency partition 1101.

The configuration of the SFH resources, and also thereby the resource allocation information pre-defined for the SFH, may change every superframe or every multiples of a superframe. The changing period may be in accordance with the changing period of the frequency partitioning information. The indication for the change of the SFH resource can be signaled via a primary synchronization channel (P-SCH), or a secondary synchronization channel (S-SCH). Otherwise, the indication can be signaled via a data bust channel using a media access control (MAC) management message and extended/additional system configuration information which is located outside of a superframe header (SFH). In other ways, without any indication signaling, the SFH resources can be periodically pre-reserved with a predefined pattern, for example, by way of setting an offset value in frequency domain or time domain. (1-10)

If DRUs are used for a SFH, a P-SCH can indicate antenna configuration information or a pilot pattern applied for a resource unit allocated to the SFH.

After time-frequency resource mapping, a predefined MIMO encoder is applied for the SFH. 2-stream spatial frequency block coding (SFBC) scheme with 2 transmit antenna is applied for the transmission of the P-SFH and S-SFH as following Equation 9 and Equation 10.

$$s = \begin{bmatrix} s_1 \\ s_2 \end{bmatrix}$$ [Equation 9]

$$z = x = \begin{bmatrix} s_1 & -s_2^* \\ s_2 & s_1^* \end{bmatrix}$$ [Equation 10]

The MIMO encoder generates a SFBC matrix, and the signal skips the beamformer/precoder block. The Pilot pattern A defined in DL PHY Section of the IEEE 802.16m amendment shall be used for SFH transmission.

For efficiency at initial access stage and minimizing unnecessary overhead, it is recommended that the transmission scheme for a SFH should be prefixed to one MIMO transmission scheme.

If 2-stream transmission outperforms 1-stream transmission, the 2-stream MIMO scheme with prefixed antenna configuration should be applied for the SFH transmission.

The present invention can be used for designing the superframe header of IEEE 802.16m amendment.

According to the present invention, the same distributed permutation rule can be applied every sub-frame irrespective of the presence of a synchronization channel (SCH) and a SFH in the sub-frame. Therefore, the complexity can be reduced when distributed permutation is applied for more than one sub-frames.

According to the present invention, a distributed permutation can be transparently applied to the users with DRUs in the sub-frame including a SFH, irrespective of the SFH resource allocation scheme.

According to the present invention, the resource for the SFH can be pre-reserved either in the logical domain or in the physical domain. If the resource for the SFH is pre-reserved in the logical domain, the permutation rule for the SFH (refer to the 1104, 1105, and 1106 of FIG. 11) may be designed the same as the permutation rule for the data only region (refer to 1107 of FIG. 11). In this case, the resources for the SFH may be distributed over the whole system band after the permutation is conducted. To the contrary, if the resource for the SFH is pre-reserved in the physical domain to be restricted in a contiguous, for example 5 MHz bandwidth, it is beneficial to design the permutation rule for the SFH differently from the conventional permutation rule for the data only region. Therefore, if the SFH resources are pre-reserved in logical domain, it is possible to reuse the conventional permutation rule for the data only region.

Figure 12:
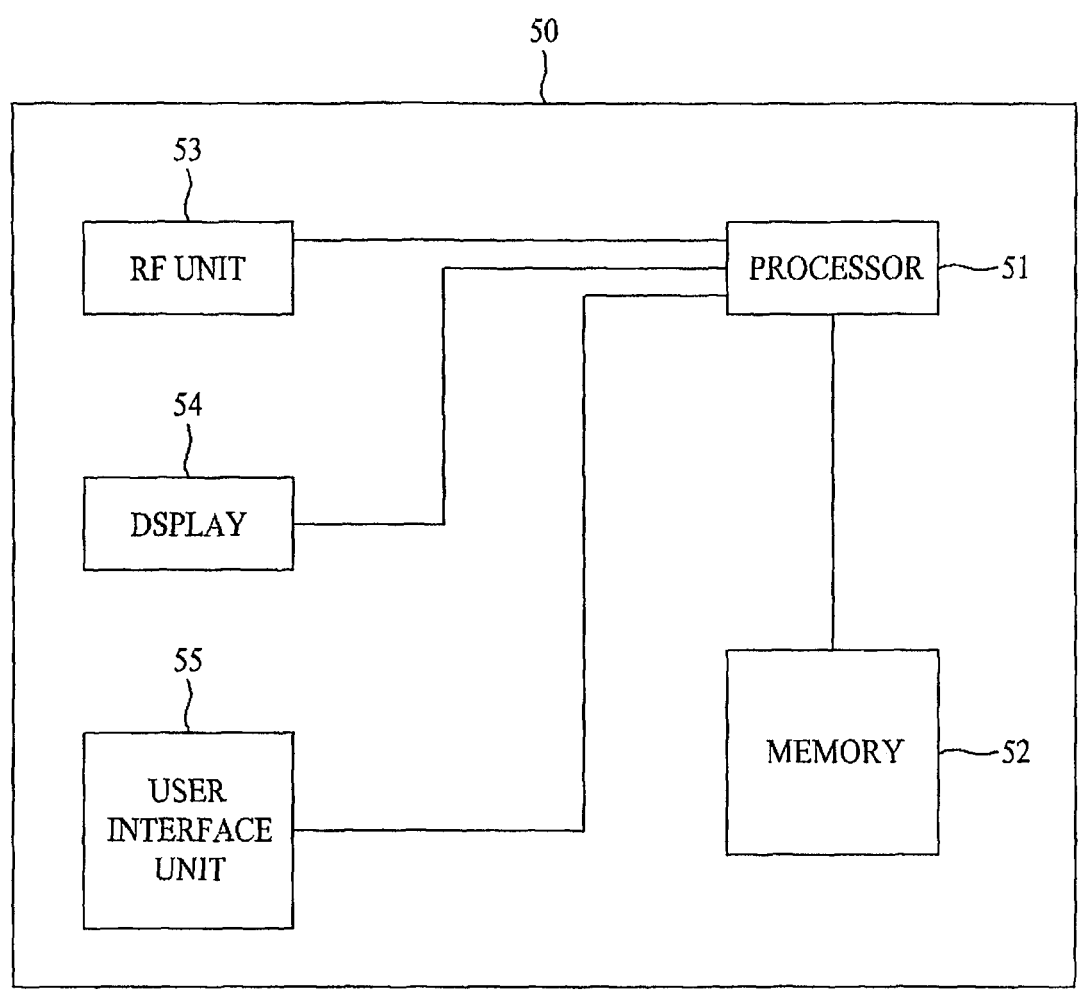
FIG. 12 is a block diagram showing a device 50, that can be either the mobile station (MS) or a base station (BS) for which the present invention is applicable.

FIG. 12 is a block diagram showing a device 50, that can be either the mobile station (MS) or a base station (BS) for which the present invention is applicable including the methods by FIG. 1 to FIG. 11. Device 50 includes a processor 51, a memory 52, a radio frequency (RF) unit 53, a display unit 54, and a user interface unit 55. Layers of a radio interface protocol are implemented in the processor 51. The processor 51 provides a control plane and a user plane. The function of each layer can be implemented in the processor 51. The processor 51 may also include a contention resolution timer. The memory 52 is coupled to the processor 51 and stores an operating system, applications, and general files. If device 50 is a MS, the display unit 54 displays a variety of information and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

Layers of a radio interface protocol between the MS and the network can be classified into a first layer (L1), a second layer (L2), and a third layer (L3) based on the lower three layers of the open system interconnection (OSI) model that is well-known in the communication system. A physical layer, or simply a PHY layer, belongs to the first layer and provides an information transfer service through a physical channel. A radio resource control (RRC) layer belongs to the third layer and serves to control radio resources between the MS and the network. The MS and the network exchange RRC messages via the RRC layer.

The RF unit 53 is used for receiving or transmitting the SFH according to the present invention as described above. In addition, the processor 51 is used to detect a synchronization channel including a primary synchronization channel and a superframe header including a primary superframe header and a secondary superframe header, and decoding the superframe header. The memory 52 may contain binary codes of the algorithm for encoding the superframe header.

The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It is apparent that the present invention may be embodied by a combination of claims which do not have an explicit cited relation in the appended claims or may include new claims by amendment after application.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. A software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a wireless mobile communication device used for a cellular system.

The invention claimed is:

1. A method for transmitting a superframe header (SFH) to mobile stations at a network in a wireless mobile communication system, the method comprising:
    transmitting a subframe including the SFH, the SFH comprising a primary superframe header (P-SFH),
    wherein indexes of logical resource units (LRUs) allocated for P-SFH transmission are continuous in value, which starts from the lowest index of LRUs included in a frequency partition that contains the SFH, and
    wherein, if the SFH further comprises a secondary superframe header (S-SFH), indexes of LRUs allocated for S-SFH transmission are continuous in value and a maximum value of the indexes of the LRUs allocated for P-SFH transmission is less than a minimum value of the indexes of the LRU allocated for S-SFH transmission by 1.

2. The method of claim 1, wherein a minimum value of the indexes of the LRU allocated for P-SFH transmission is 0 (zero).

3. The method of claim 1, wherein the P-SFH comprises resource allocation information for the S-SFH and resource allocation information for a first data channel included in the subframe.

4. The method of claim 1, wherein the S-SFH comprises resource allocation information for a second data channel included in another subframe which follows the subframe and does not include a SFH.

5. The method of claim 1, the SFH includes resource allocation information for another subframe which includes a SFH and succeeds the subframe.

6. A method for receiving a superframe header (SFH) at mobile stations from a network in a wireless mobile communication system, the method comprising:
    receiving a subframe including the SFH, the SFH comprising a primary superframe header (P-SFH),
    wherein indexes of logical resource units (LRUs) allocated for P-SFH transmission are continuous in value, which starts from the lowest index of LRUs included in a frequency partition that contains the SFH, and
    wherein, if the SFH further comprises a secondary superframe header (S-SFH), indexes of LRUs allocated for S-SFH transmission are continuous in value and a maximum value of the indexes of the LRUs allocated for the P-SFH transmission is less than a minimum value of the indexes of the LRU allocated for the S-SFH transmission by 1.

7. The method of claim 6, wherein a minimum value of the indexes of the LRU allocated for the P-SFH transmission is 0 (zero).

8. The method of claim 6, wherein the P-SFH comprises resource allocation information for the S-SFH and resource allocation information for a first data channel included in the subframe.

9. The method of claim 6, wherein the S-SFH comprises resource allocation information for a second data channel included in another subframe which follows the subframe and does not include a SFH.

10. The method of claim 6, the SFH includes resource allocation information for another subframe which includes a SFH and succeeds the subframe.

* * * * *